(12) United States Patent
Molter et al.

(10) Patent No.: US 6,855,450 B2
(45) Date of Patent: Feb. 15, 2005

(54) PROTON EXCHANGE MEMBRANE ELECTROCHEMICAL CELL SYSTEM

(75) Inventors: Trent M. Molter, Glastonbury, CT (US); Mark E. Dristy, Kutztown, PA (US)

(73) Assignee: Proton Energy Systems, Inc., Rocky Hill, CT (US)

( * ) Notice: Subject to any disclaimer, the term of this patent is extended or adjusted under 35 U.S.C. 154(b) by 204 days.

(21) Appl. No.: 09/909,846

(22) Filed: Jul. 20, 2001

(65) Prior Publication Data

US 2002/0022173 A1 Feb. 21, 2002

Related U.S. Application Data

(60) Provisional application No. 60/219,526, filed on Jul. 20, 2000.

(51) Int. Cl.$^7$ .............................. H01M 8/02; C25B 9/00
(52) U.S. Cl. ......................................... 429/38; 204/258
(58) Field of Search ..................... 429/38, 39; 204/252, 204/253, 257, 258

(56) References Cited

U.S. PATENT DOCUMENTS

| | | | |
|---|---|---|---|
| 4,124,478 A | * 11/1978 | Tsien et al. | 429/39 X |
| 4,169,917 A |   10/1979 | Baker et al. | 429/24 |
| 4,500,403 A | *  2/1985 | King | 204/257 X |
| 4,719,157 A | *  1/1988 | Tsutsumi et al. | 429/34 |
| 4,758,481 A | *  7/1988 | Fauvel | 429/39 |
| 5,629,104 A |    5/1997 | Crawford, Sr. et al. | 429/34 |
| 5,698,337 A |   12/1997 | Nitschke et al. | 429/35 |
| 5,736,269 A |    4/1998 | Okamoto et al. | 429/32 |
| 5,750,281 A |    5/1998 | Washington et al. | 429/39 |
| 5,789,091 A |    8/1998 | Wozniczka et al. | 429/12 |
| 5,804,326 A |    9/1998 | Chow et al. | 429/26 |
| 5,976,726 A |   11/1999 | Wilkinson et al. | 429/35 |
| 5,993,987 A |   11/1999 | Wozniczka et al. | 429/37 |
| 6,036,827 A | *  3/2000 | Andrews et al. | 204/257 X |
| 6,057,054 A |    5/2000 | Barton et al. | 429/42 |
| 6,066,409 A |    5/2000 | Ronne et al. | 429/39 |
| 6,080,503 A |    6/2000 | Schmid et al. | 429/35 |
| 6,365,032 B1 |   4/2002 | Shiepe et al. | 205/388 |
| 6,524,452 B1 | * 2/2003 | Clark et al. | 429/38 X |

* cited by examiner

*Primary Examiner*—Stephen J. Kalafut
(74) *Attorney, Agent, or Firm*—Cantor Colburn LLP

(57) ABSTRACT

A compression member for an electrochemical cell stack is provided. The compression member includes a first surface including a plurality of raised portions, a second surface including a substantially flat surface, and an edge defined by the first surface and the second surface. The plurality of raised portions is aligned to define a plurality of receiving areas. The plurality of raised portions and the plurality of receiving areas are configured such application of an axial compressive force spreads the plurality of raised portions into the plurality of receiving areas. The edge includes a portion configured to receive an electrochemical cell terminal therethrough. The compression member is formed of electrically non-conductive materials.

9 Claims, 7 Drawing Sheets

PROTON EXCHANGE MEMBRANE ELECTROCHEMICAL CELL SYSTEM

CROSS REFERENCE TO RELATED APPLICATION

This application claims the benefit of U.S. Provisional Patent Application Ser. No. 60/219,526 filed Jul. 20, 2000, the entire content of which is incorporated herein by reference.

BACKGROUND

The present disclosure relates to electrochemical cells, and in particular to features of proton exchange membrane electrochemical cell systems.

Electrochemical cells are energy conversion devices, usually classified as either electrolysis cells or fuel cells. A proton exchange membrane electrolysis cell can function as a hydrogen generator by electrolytically decomposing water to produce hydrogen and oxygen gas, and can function as a fuel cell by electrochemically reacting hydrogen with oxygen to generate electricity. Referring to FIG. 1, which is a partial section of a typical anode feed electrolysis cell 100, process water 102 is fed into cell 100 on the side of an oxygen electrode (anode) 116 to form oxygen gas 104, electrons, and hydrogen ions (protons) 106. The reaction is facilitated by the positive terminal of a power source 120 electrically connected to anode 116 and the negative terminal of power source 120 connected to a hydrogen electrode (cathode) 114. The oxygen gas 104 and a portion of the process water 108 exit cell 100, while protons 106 and water 110 migrate across a proton exchange membrane 118 to cathode 114 where hydrogen gas 112 is formed.

Another typical water electrolysis cell using the same configuration as is shown in FIG. 1 is a cathode feed cell, wherein process water is fed on the side of the hydrogen electrode. A portion of the water migrates from the cathode across the membrane to the anode where hydrogen ions and oxygen gas are formed due to the reaction facilitated by connection with a power source across the anode and cathode. A portion of the process water exits the cell at the cathode side without passing through the membrane.

A typical fuel cell uses the same general configuration as is shown in FIG. 1. Hydrogen gas is introduced to the hydrogen electrode (the anode in fuel cells), while oxygen, or an oxygen-containing gas such as air, is introduced to the oxygen electrode (the cathode in fuel cells). Water can also be introduced with the feed gas. The hydrogen gas for fuel cell operation can originate from a pure hydrogen source, hydrocarbon, methanol, or any other hydrogen source that supplies hydrogen at a purity suitable for fuel cell operation (i.e., a purity that does not poison the catalyst or interfere with cell operation). Hydrogen gas electrochemically reacts at the anode to produce protons and electrons, wherein the electrons flow from the anode through an electrically connected external load, and the protons migrate through the membrane to the cathode. At the cathode, the protons and electrons react with oxygen to form water, which additionally includes any feed water that is dragged through the membrane to the cathode. The electrical potential across the anode and the cathode can be exploited to power an external load.

In other embodiments, one or more electrochemical cells can be used within a system to both electrolyze water to produce hydrogen and oxygen, and to produce electricity by converting hydrogen and oxygen back into water as needed. Such systems are commonly referred to as regenerative fuel cell systems.

Electrochemical cell systems typically include one or more individual cells arranged in a stack, with the working fluids directed through the cells via input and output conduits formed within the stack structure. The cells within the stack are sequentially arranged, each including a cathode, a proton exchange membrane, and an anode (hereinafter "membrane electrode assembly", or "MEA"). Each cell typically further comprises a first flow field in fluid communication with the cathode and a second flow field in fluid communication with the anode. The MEA may be supported on either or both sides by screen packs or bipolar plates disposed within the flow fields, and which may be configured to facilitate membrane hydration and/or fluid movement to and from the MEA.

In order to maintain intimate contact between cell components under a variety of operational conditions and over long time periods, uniform compression is applied to the cell components. Thus, while existing compression in current electrochemical cells are suitable for their intended purposes, there still remains a need for improvements, particularly regarding devices and methods for providing uniform compression to the electrochemical cell.

SUMMARY

The above-described drawbacks and disadvantages are alleviated by a compression member for an electrochemical cell stack. The compression member includes a first surface including a plurality of raised portions, a second surface including a substantially flat surface, and an edge defined by the first surface and the second surface. The plurality of raised portions is aligned to define a plurality of receiving areas. The plurality of raised portions and the plurality of receiving areas are configured such that application of an axial compressive force spreads the plurality of raised portions into the plurality of receiving areas. The edge includes a portion configured to receive an electrochemical cell terminal therethrough. The compression member is formed of electrically non-conductive materials.

An electrically conductive bus plate for an electrochemical cell stack is provided. The bus plate includes a substantially planar portion defining an edge and a terminal portion extending from the edge. The terminal portion includes a first portion and a second portion. The first portion is substantially perpendicular to the substantially planar portion, while the second portion is angled with respect to the first portion toward the substantially planar portion.

An electrochemical cell stack is provided. The electrochemical cell stack includes a first endplate, a second endplate, an electrochemical cell, a first conductor, and a second conductor. The first endplate has one fluid passage for a water feed, one fluid passage for an oxygen output, and one fluid passage for a hydrogen output. The electrochemical cell is disposed between a first separator and a second separator. The electrochemical cell includes a first electrode in electrical communication with the first separator, a second electrode in electrical communication with the second separator, and a membrane layer between the first electrode and the second electrode. The first electrode is in fluid communication with the fluid passage for the water feed and the one fluid passage for the oxygen output. The second electrode is in fluid communication with the one fluid passage for the hydrogen output. The first conductor is accessible through the first endplate and is in electrical communication with the first separator. Similarly, the second conductor is accessible through the second endplate and is in electrical communication with the second separator.

An electrochemical cell stack is provided. The electrochemical cell stack includes a first endplate, a second endplate, an electrochemical cell, a first non-conductive compression member, and a second non-conductive compression member. The electrochemical cell is between a first separator and a second separator. The electrochemical cell includes a first electrode in electrical communication with the first separator, a second electrode in electrical communication with the second separator, and a membrane layer between the first electrode and the second electrode. The first non-conductive compression member is between the first separator and the first endplate. Similarly, the second non-conductive compression member is between the second separator and the second endplate. The first electrode is accessible through the first non-conductive compression member and the first endplate, while the second electrode is accessible through the second non-conductive compression member and the second endplate.

A frame member for an electrochemical cell stack is provided. The frame member includes an outer periphery, an inner periphery and a surface defined by the peripheries. The frame member also includes a fluid port defined axially through the surface and a plurality of fluid manifolds defined in the surface. The fluid port has a length along the inner and the outer peripheries. Each of the plurality of fluid manifolds defines a fluid flow channel between the fluid port and the inner periphery. Moreover, at least one of the plurality of fluid manifolds extends along the inner periphery a distance beyond the length of the fluid port.

An improvement in a hydrogen generating system including a water source, an electrochemical cell stack, an electrical source, a high-pressure separator, a low-pressure separator, a dryer, a controller, and a ventilation system is provided. The improvement includes a first flow field within the electrochemical cell stack between a first electrode and a separator. The first flow field is surrounded in the radial direction by a first frame. Similarly, a second flow field between a second electrode and a separator is surrounded in the radial direction by a second frame. A boundary is defined between an inside edge of the first frame and an outside edge of the flow field, wherein the boundary is configured with gaps in fluid communication with one or more manifolds.

The above discussed and other features and advantages will be appreciated and understood by those skilled in the art from the following detailed description and drawings.

BRIEF DESCRIPTION OF THE DRAWINGS

Referring now to the drawings, which are meant to be exemplary and not limiting, and wherein like elements are numbered alike in the several Figures.

DETAILED DESCRIPTION

Disclosed herein are novel methods and apparatus for providing uniform compression to cell components of electrochemical cells under a variety of operational conditions and over long time periods.

Although the disclosure below is described in relation to a proton exchange membrane electrochemical cell employing hydrogen, oxygen, and water, various reactants may also be used, including, but not limited to, hydrogen bromine, oxygen, air, chlorine, and iodine. Upon the application of different reactants and/or different electrolytes, the flows and reactions are understood to change accordingly, as is commonly understood in relation to that particular type of electrochemical cell.

Figure 2:
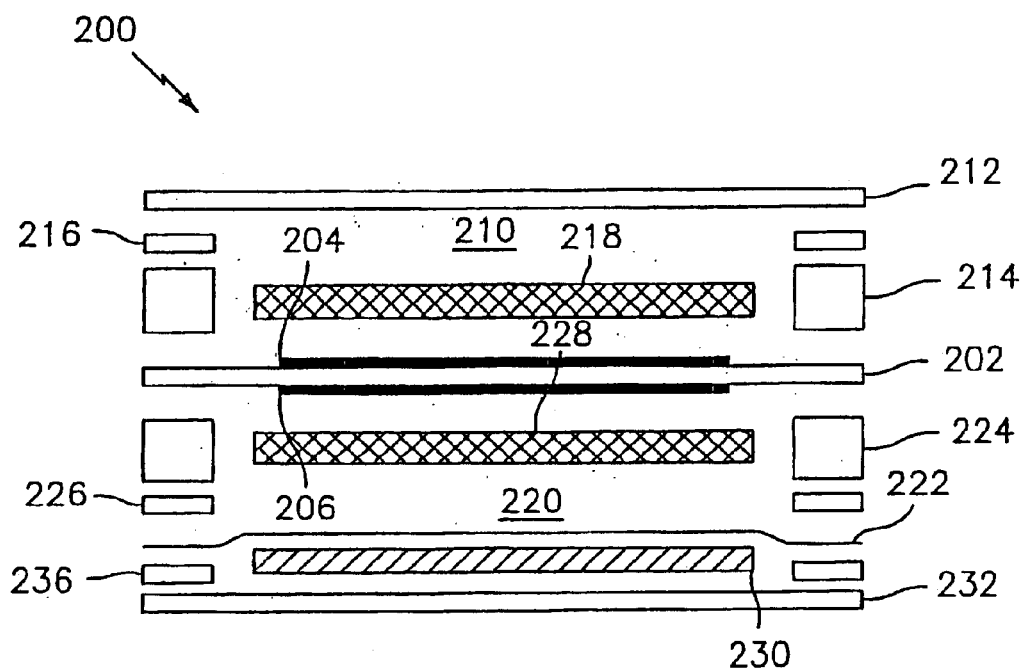
FIG. 2 is an expanded schematic diagram of a prior art electrochemical cell.

Referring to FIG. 2, one exemplary embodiment of an electrochemical cell 200 suitable for operation as an anode feed electrolysis cell, cathode feed electrolysis cell, fuel cell, or regenerative fuel cell is schematically shown. Thus, while the discussion below is directed to an anode feed electrolysis cell, it should be understood that cathode feed electrolysis cells, fuel cells, and regenerative fuel cells are also within the scope of the present invention. Cell 200 is typically one of a plurality of cells employed in a cell stack as part of an electrochemical cell system. When cell 200 is used as an electrolysis cell, power inputs are generally between about 1.48 volts and about 3.0 volts, with current densities between about 50 A/ft$^2$ (amperes per square foot) and about 4,000 A/ft$^2$. When used as a fuel cells power outputs range between about 0.4 volts and about 1 volt, and between about 0.1 A/ft$^2$ and about 10,000 A/ft$^2$. The number of cells within the stack, and the dimensions of the individual cells is scalable to the cell power output and/or gas output requirements.

Cell 200 includes a membrane 202 having a first electrode (e.g., an anode) 204 and a second electrode (e.g., a cathode) 206 disposed on opposite sides thereof. Flow fields 210, 220, which are in fluid communication with electrodes 204 and 206, respectively, are defined generally by the regions proximate to, and bounded on at least one side by, each electrode 204 and 206 respectively. A flow field member 228, for example a screen pack or bipolar plate, is optionally disposed within flow field 220 between electrode 206 and, optionally, a pressure pad separator plate 222. A pressure pad 230 is typically disposed between pressure pad separator plate 222 and a cell separator plate 232. Cell separator plate 232 is disposed adjacent to pressure pad 230. A frame 224, generally surrounding flow field 220 and an optional gasket 226, is disposed between frame 224 and pressure pad separator plate 222 generally for enhancing the seal within the reaction chamber defined on one side of cell 200 by frame 224, pressure pad separator plate 222 and electrode 206. Gasket 236 is optionally disposed between pressure pad separator plate 222 and cell separator pad 232 enclosing pressure pad 230.

Another flow field member 218 is optionally disposed in flow field 210. A frame 214 generally surrounds flow field member 218, a cell separator plate 212 is disposed adjacent flow field member 218 opposite oxygen electrode 204, and a gasket 216 is disposed between frame 214 and cell separator plate 212, generally for enhancing the seal within the reaction chamber defined by frame 214, cell separator plate 212 and the oxygen side of membrane 202. The cell components, particularly cell separator plates 212, 232, frames 214, 224, and gaskets 216, 226, and 236 are formed with the suitable manifolds or other conduits as is conventional.

Membrane 202 comprises electrolytes that are preferably solids or gels under the operating conditions of the electrochemical cell. Useful materials include proton conducting ionomers and ion exchange resins. Useful proton conducting ionomers include complexes comprising an alkali metal salt, alkali earth metal salt, a protonic acid, or a protonic acid salt. Useful complex-forming reagents include alkali metal salts, alkaline metal earth salts, and protonic acids and protonic acid salts. Counter-ions useful in the above salts include halogen ion, perchloric ion, thiocyanate ion, trifluoromethane sulfonic ion, borofluoric ion, and the like. Representative examples of such salts include, but are not limited to, lithium fluoride, sodium iodide, lithium iodide, lithium perchlorate, sodium thiocyanate, lithium trifluoromethane sulfonate, lithium borofluoride, lithium hexafluorophosphate, phosphoric acid, sulfuric acid, trifluoromethane sulfonic acid, and the like. The alkali metal salt, alkali earth metal salt, protonic acid, or protonic acid salt is complexed with one or more polar polymers such as a polyether, polyester, or polyimide, or with a network or cross-linked polymer containing the above polar polymer as a segment. Useful polyethers include polyoxyalkylenes, such as polyethylene glycol, polyethylene glycol monoether, and polyethylene glycol diether; copolymers of at least one of these polyethers, such as poly(oxyethylene-co-oxypropylene) glycol, poly(oxyethylene-co-oxypropylene) glycol monoether, and poly(oxyethylene-co-oxypropylene) glycol diether; condensation products of ethylenediamine with the above polyoxyalkylenes; and esters, such as phosphoric acid esters, aliphatic carboxylic acid esters or aromatic carboxylic acid esters of the above polyoxyalkylenes. Copolymers of, e.g., polyethylene glycol with dialkylsiloxanes, maleic anhydride, or polyethylene glycol monoethyl ether with methacrylic acid are known in the art to exhibit sufficient ionic conductivity to be useful.

Ion-exchange resins useful as proton conducting materials include hydrocarbon- and fluorocarbon-type resins. Hydrocarbon-type ion-exchange resins include phenolic resins, condensation resins such as phenol-formaldehyde, polystyrene, styrene-divinyl benzene copolymers, styrene-butadiene copolymers, styrene-divinylbenzene-vinylchloride terpolymers, and the like, that are imbued with cation-exchange ability by sulfonation, or are imbued with anion-exchange ability by chloromethylation followed by conversion to the corresponding quaternary amine.

Fluorocarbon-type ion-exchange resins include hydrates of tetrafluoroethylene-perfluorosulfonyl ethoxyvinyl ether or tetrafluoroethylene-hydroxylated (perfluoro vinyl ether) copolymers. When oxidation and/or acid resistance is desirable, for instance, at the cathode of a fuel cell, fluorocarbon-type resins having sulfonic, carboxylic and/or phosphoric acid functionality are preferred. Fluorocarbon-type resins typically exhibit excellent resistance to oxidation by halogen, strong acids and bases. One family of fluorocarbon-type resins having sulfonic acid group functionality is NAFION™ resins (commercially available from E. I. du Pont de Nemours and Company, Wilmington, Del.).

Electrodes 204 and 206 comprise catalyst suitable for performing the needed electrochemical reaction (i.e., electrolyzing water to produce hydrogen and oxygen). Suitable metals from which electrodes can be fabricated include, but are not limited to, platinum, palladium, rhodium, carbon, gold, tantalum, tungsten, ruthenium, iridium, osmium, alloys of at least one of the foregoing catalysts, and the like. However, while certain catalysts are specifically listed, it is contemplated that other catalysts capable of electrolyzing water and producing hydrogen (in the case of electrolysis cell operation) and/or capable of breaking down hydrogen into ions (in the case of fuel cell operation) are suitable with the electrode structure generally described. A preferred catalyst is platinum or palladium. Electrodes 204 and 206 may be created by layering or pressing electrode catalyst provided in a planar form on membrane 202. Both techniques are known in the art.

Flow field members 218, 228 support membrane 202, allow the passage system fluids to promote hydration of cell components, and preferably are electrically conductive, and may be, for example, screen packs or bipolar plates. The screen packs include one or more layers of perforated sheets or a woven mesh formed from metal or strands. These screens are typically fabricated of metals that include, for example, niobium, zirconium, tantalum, titanium, carbon steel, stainless steel, nickel, cobalt, and alloys thereof. Bipolar plates are commonly perforated structures through which fluid communication can be maintained. Materials from which the bipolar plates can be fabricated include, but are not limited to, fibrous carbon or fibrous carbon impregnated with polytetrafluoroethylene or PTFE (commercially available under the trade name TEFLON® from E. I. du Pont de Nemours and Company).

Pressure pad 230 provides even compression between cell components, is electrically conductive, and therefore generally comprises a resilient member, preferably an elastomeric material, together with a conductive material. Suitable elastomeric materials include, but are not limited to silicones, such as, for example, fluorosilicones; fluoroelastomers, such as KALREZ® (commercially available from E. I. du Pont de Nemours and Company), VITON® (commercially available from E. I. du Pont de Nemours and Company), and FLUOREL® (commercially available from Minnesota Mining and Manufacturing Company, St. Paul, Minn.); and combinations thereof. The electrically conductive material is preferably compatible with the system fluids and membrane 202. Suitable electrically conductive materials include, but are not limited to, conductive metals and alloys and superalloys thereof, for example niobium; zirconium; tantalum; titanium; niobium; iron and iron alloys, for examples steels such as stainless steel; nickel and nickel alloys such as HASTELLOY7 (commercially available from Haynes International, Kokomo, Ind.); cobalt and cobalt superalloys such as ELGILOY7 (commercially available from Elgiloy® Limited Partnership, Elgin, Ill.) and MP35N7 (commercially available from Maryland Speciality Wire, Inc., Rye, N.Y.); hafnium, and tungsten, among others, with titanium being preferred because of its strength, durability, availability, low cost, ductility, low density, and its compatibility with the electrochemical cell environment. Conductive carbon is also often used. In one embodiment, the electrically conductive material comprises a plurality of VITON® cords woven or stitched into a conductive carbon cloth substrate. Pressure pad 230 is optionally configured to allow passage of water or system gases.

It has been discovered that improvements in the construction and operation of electrochemical cell 200 are found by providing a compression system at both ends of the cell, thereby allowing operation of the electrochemical cell system at cell pressures from atmospheric pressure up to about 100 pounds per square inch (psi), preferably up to about 150 psi, more preferably about 250 psi, even more preferably about 500 psi, and most preferably up to about 1,000 psi or greater. Moreover, it has been determined that improvements in the cost and ease of manufacture of electrochemical cell 200 are found by providing separating the electrically conductive functions and compression function of the compression system. Additionally, it has been determined that further improvements in the cost and ease of manufacture of electrochemical cell 200 are found by providing three port frames within the cell.

Referring now to FIGS. 3–6, an exemplary embodiment of an electrochemical cell stack 300 is illustrated. Cell stack 300, illustrated in FIG. 3, comprises a cell assembly 302, shown for ease of description as one cell. Cell stack 300 including more than one cell assembly 302 having separators disposed therebetween is considered within the scope of the present invention.

Cell assembly 302 is arranged between a first endplate 304 and a second endplate 306. Endplates 304 and 306 are formed of any suitable material, such as but not limited to carbon steel, stainless steel, titanium, aluminum, graphite, ceramics, and the like. Cell stack 300 includes at least one mounting bracket 308 for overall securement of the cell stack.

Fittings 310, 312, and 314 are included on first endplate 304, wherein fitting 310 accepts suitable tubing for feed water (not shown) from outside cell stack 300, fitting 312 accepts suitable tubing for water and oxygen output (not shown), and fitting 314 accepts suitable tubing for hydrogen output (not shown). Fittings 310, 312, and 314 are formed of any suitable material, such as but not limited to carbon steel, stainless steel, titanium, aluminum and the like.

To facilitate electrical connection, a pair of electrical terminals 316 and 318 extends from first endplate 304 and second endplate 306, respectively. In one embodiment, terminals 316 and 318 extend axially from endplates 304 and 306. Terminals 316 and 318 are in electrical contact with separators at the ends of cell assembly 302 (as described further herein) and extend through endplates 304 and 306. Terminals 316 and 318 are formed of any suitable conductive material, including but not limited to, copper, aluminum, and alloys of any of the aforementioned conductive materials. Furthermore, terminals 316 and 318 being plated with conductive material are considered within the scope of the present invention. In one embodiment, terminals 316 and 318 are integrally formed with a bus, as described further herein.

A first shim 320 and a gasket (shown below at 324 with reference to FIG. 7) are provided between the inside surface of first endplate 304 and one end of cell assembly 302, and a second shim 322 is provided between the inside surface of second endplate 306 and the opposite end of cell assembly 302. By way of example, shims 320 and 322 are generally ring shaped plastic components each having a central opening and fluid passages disposed in the body portion of the component. Shims 320 and 322 provide electrical insulation from the electrically conductive members of the cell stack, e.g., separators at the ends of cell assembly 302 (as described further herein).

In one embodiment, as described further herein, bus portions having terminals 316 and 318 extending therefrom are arranged within the central openings of the respective shims 320 and 322. In another embodiment, as described further herein, a pressure pad is included within the central openings of the respective shims 320 and 322 between (in the axial direction) each of the bus portions and the respective endplates 304 and 306. Thus, shims 320 and 322 being configured with suitably dimensioned openings are considered within the scope of the present invention.

As discussed above, shims 320 and 322 provide electrical insulation from the electrically conductive members of the cell stack. Suitable insulation or non-conductive material for shims 320 and 322 include, but are not limited to polyetherimides (e.g. ULTEM® 1000 commercially available from General Electric Company, Pittsfield, Mass.), polycarbonates, polysulfonates, or any blend or mixture of any of the aforementioned plastics. Gasket 324 is configured to seal the fluid flow. Thus, gasket 324 is preferably ring shaped and is formed of a sealing material including but not limited to polytetrafluoroethylene (e.g., TEFLON® or TEFZEL®).

Cell stack 300 is operated at pressures of up to about 150, or under higher pressures. For example, the overall pressure of the system is between about 150 pounds per square inch (psi) and 2500 psi, preferably between about 250 and 1,000 psi. To maintain structural integrity of cell stack 300, cell assembly 302 and shims 320 and 322 are sandwiched between endplates 304 and 306 and suitably secured. For example, cell stack 300 is secured with a plurality of screws 326 and corresponding nuts 328 and washers 330 each through suitable openings in first endplate 304, first shim 320, cell assembly 302, second shim 322, second endplate 306, and a spring 332. In one embodiment, spring 332 is a disc spring assembly comprising a plurality of disc springs disposed between a pair of washers.

In one exemplary embodiment, and referring to FIGS. 7–11, to reduce potential contamination, first shim 320 is configured with appropriate bosses 334 that extend into openings in first endplate 304 such that first shim 320 acts as a manifold such that the system fluids do not contact the materials of first endplate 304. Thus, bosses 334 provide fluid isolation between the inlet and outlet fluids with respect to first endplate 304.

Figure 10:
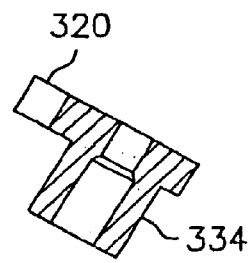
FIG. 10 is a section view of the manifold of FIG. 9, taken along lines 10—10.
Figure 9:
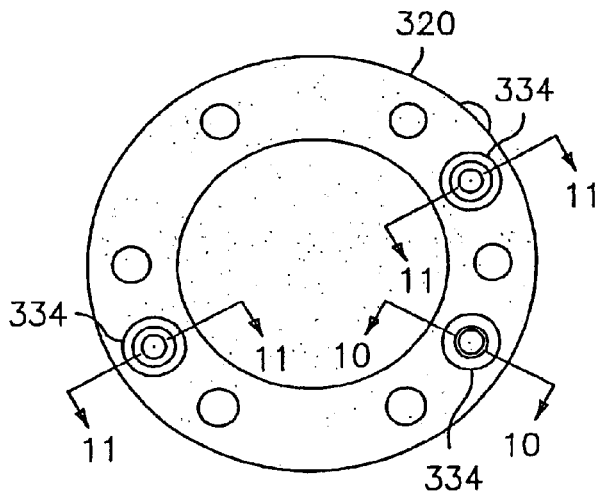
FIG. 9 is a top view of the manifold of FIG. 8.
Figure 11:
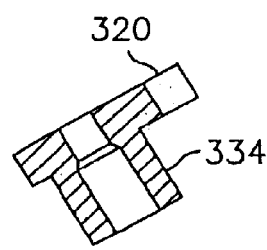
FIG. 11 is a section view of the manifold of FIG. 9, taken along lines 11—11.

By way of example, FIG. 10 illustrates bosses 334 configured for hydrogen throughput via fitting 314 (not shown), while FIG. 11 illustrates bosses configured for water and oxygen fluid throughput via fittings 310 and 312, respectively (not shown).

Figure 7:
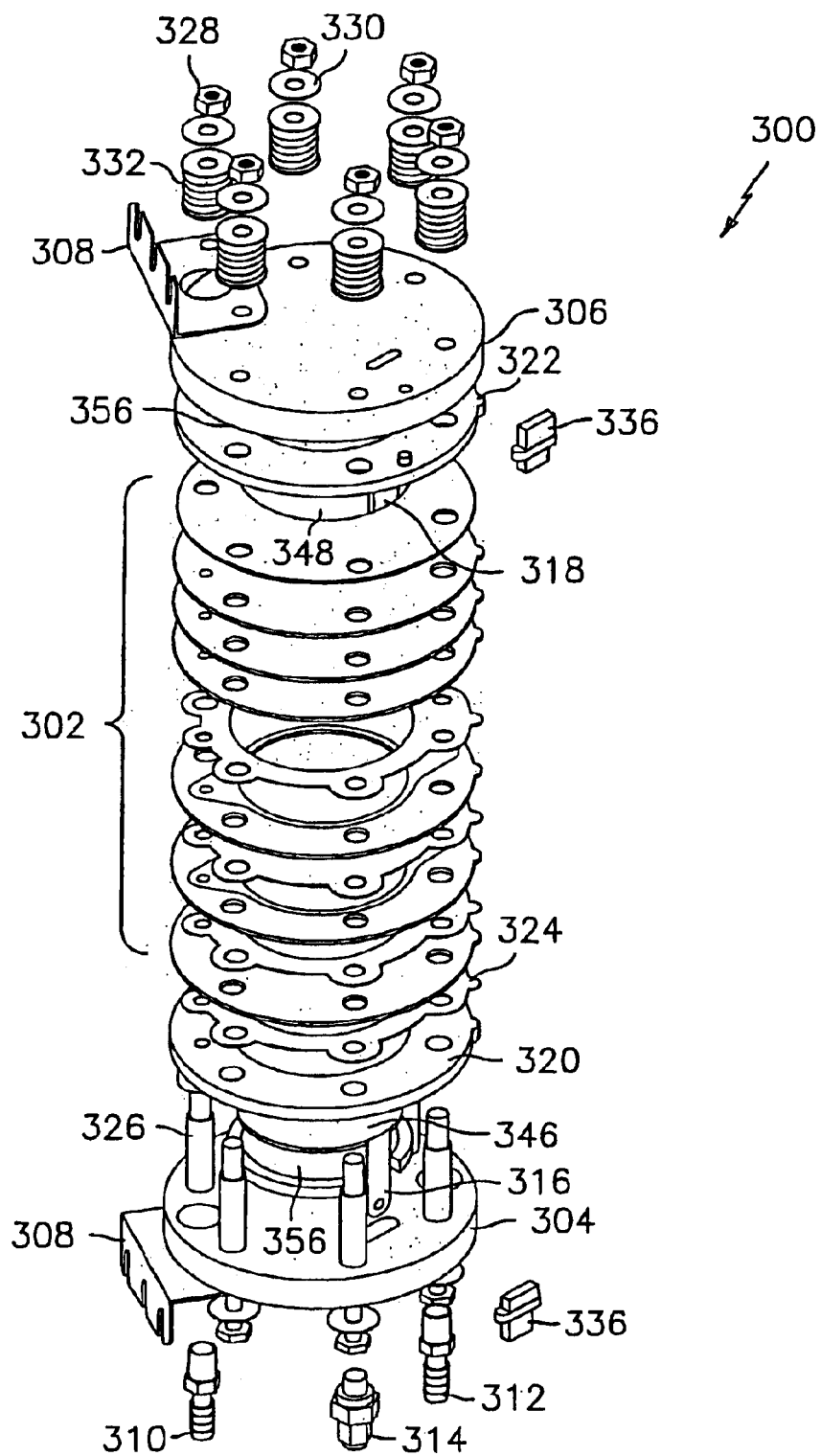
FIG. 7 is an exploded view of the electrochemical cell stack of FIG. 3.
Figure 8:
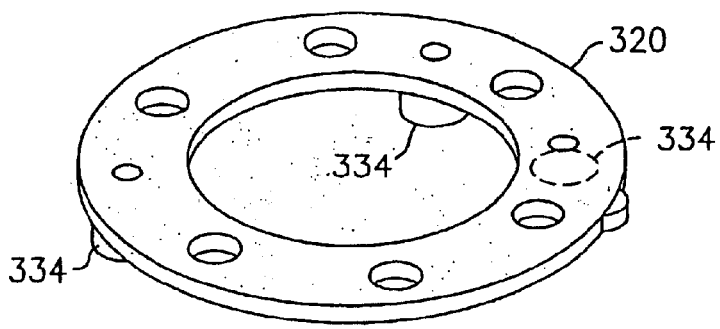
FIG. 8 is a perspective view of an exemplary embodiment of a manifold.
Figure 12:
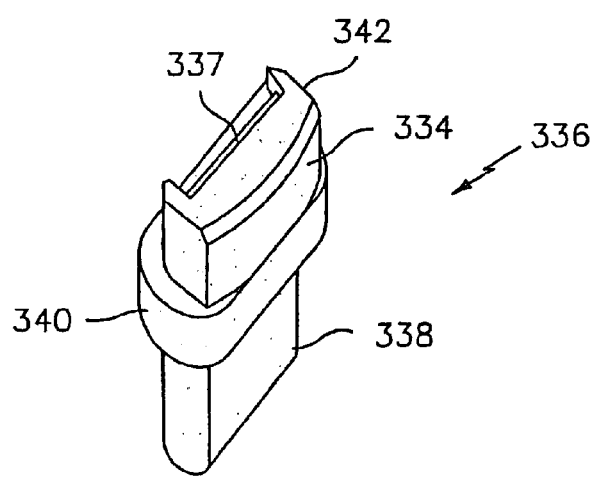
FIG. 12 is a perspective view of an exemplary embodiment of an insulator.

In another exemplary embodiment, and referring to FIGS. 7 and 12, terminals 316 and 318 are electrically insulated from endplates 304 and 306. FIG. 12 depicts an insulator 336 that fits within mating slots formed in endplates 304 and 306. A suitable insulator 336 is a molded component having a slot 337 formed therethrough for passage of terminals 316 and 318. Further, each insulator 336 preferably includes portion 338 and 340 configured to mate into a corresponding opening in the respective endplate generally to maintain positioning of insulator 336 during assembly and operation, and a portion 342 having a surface 334 configured to be positioned adjacent to the respective shims 320 and 322.

A suitable non-conductive material for insulators 336 includes, but is not limited to polyetherimides (e.g. ULTEM® 1000 commercially available from General Electric Company, Pittsfield, Mass.), polycarbonates, polysulfonates, or any blend or mixture of any of the aforementioned materials.

Figure 13:
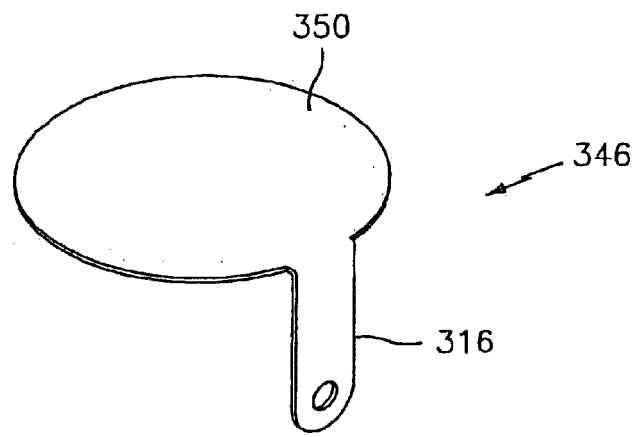
FIG. 13 is a perspective view of an exemplary embodiment of a bus plate.
Figure 14:
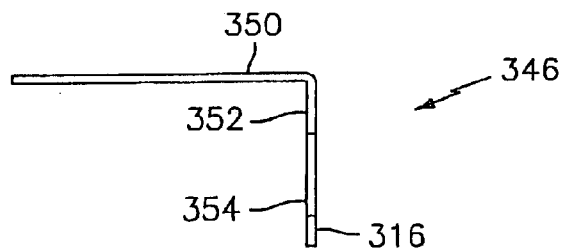
FIG. 14 is a side view of the bus plate of FIG. 13.

In still another exemplary embodiment, and referring to FIGS. 7, 13, and 14, a bus 346 having terminal 316 extending therefrom is depicted. A second bus 348 is also depicted in FIG. 7, which has terminal 318 extending therefrom. Second bus 348 is similar or identical in structure to bus 346. Bus 346 and/or 348 comprises a planar portion 350 having terminal 316 extending suitably to provide access to electrical connection. As depicted in FIG. 14, bus 346 includes a perpendicular portion 352 extending substantially normally from planar portion 350, and further having a portion 354 upon which terminal 316 is disposed.

Portion 354 has a bend of approximately three degrees relative to portion 352. The bend facilitates formation of sub-assemblies, e.g., a sub-assembly of bus 346, insulator 336, a compression member 356 (described further herein), and endplate 304, and a like sub-assembly on the opposite side of the cell stack. The bent portion 354 has spring characteristics to hold the sub-assembly components together during manufacture, transport, or storage.

In certain alternate embodiments, terminal 316 extends substantially parallel to portion 350, wherein electrical connection is facilitated proximate to or outside of the radial edge surface of the stack rather than out of the axial edge of the stack (e.g., through endplate 304 as described above).

In still another exemplary embodiment illustrated in FIGS. 7 and 15–17, compression member 356 is provided at each end of cell stack 300. Depending on system needs and configurations, compression members 356 are included on both or either end of stack 300. Compression members 356 are fabricated from a non-conductive material that is moldable into the desired shape of the proper dimensions. With the inclusion of compression members 356, contact between the electrical bus and the respective separator is enhanced, thereby promoting lower resistance. In a preferred embodiment, both compression members 356 are similar or identical to one another.

Suitable non-conductive materials for compression members 356 are elastomeric materials, including but not limited to silicone rubber, fluoroelastomers, such as VITON® (commercially available from Dupont de Nemours), terpolymers of ethylene and propylene, such as EPDM, or any blend or mixture of any of the aforementioned elastomeric materials.

Figure 15:
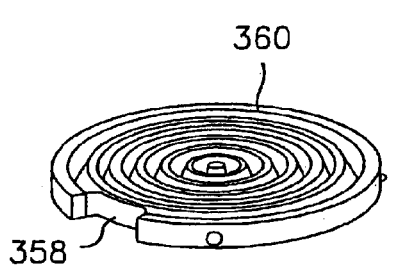
FIG. 15 is a bottom perspective view of an exemplary embodiment of a compression member.
Figure 16:
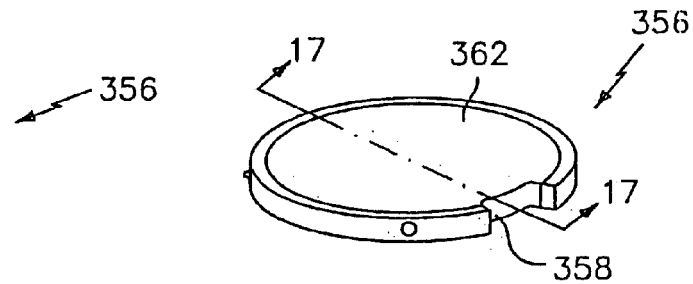
FIG. 16 is a top perspective view of the compression member of FIG. 15.
Figure 17:
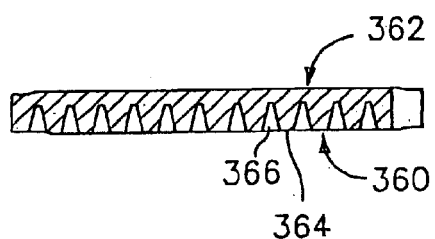
FIG. 17 is a sectional view of the compression member of FIG. 15, taken along lines 17—17.

In one embodiment, as shown in FIG. 17, a ridged surface 360 (as also shown in FIG. 15) facially opposes the inside surface of the respective endplate, and a substantially flat surface 362 (as shown in FIG. 16) facially opposes a bus, e.g., at the portion 350 of bus 346 described with respect to FIGS. 13 and 14.

Surface 360 comprises a plurality of raised portions 364 in a concentric arrangement, forming receiving areas 366 between portions 364. In a compression system into which pressure pad(s) are incorporated, the pressure pads are typically preloaded such that the equilibrium stress level (stress level at rest) counteracts stresses arising from the pressurization levels of the working fluids of the electrochemical cell. In other systems, additional pressure (e.g., approximately 50 psi) is added to ensure contact between the cell parts. Typically, during operation, compression members 356 are maintained at compressive stress levels between about 50 psi to about 2500 psi, preferably between about 375 psi to about 500 psi. The configuration of surface 360 allows the elastomeric material to spread in the radial direction into areas 366 upon compression portions 364 of in the axial direction.

In a further embodiment, compression members 356 are configured with a portion 358 at the circumferential edge that allows terminal 316 to extend through the inside of shim 320 through endplate 304. Alternatively, the pressure pad is configured such that the terminal passes through an opening in the pressure pad. The dimensions are such that upon assembly, there is minimal space between one face of terminal 316 and portion 358, and the opposite face of terminal 316 and the inside edge of shim 320. In another embodiment, portion 358 is configured to facilitate formation of a sub-assembly, for example as was described above with respect to portion 354 of terminal 316.

Figure 3:
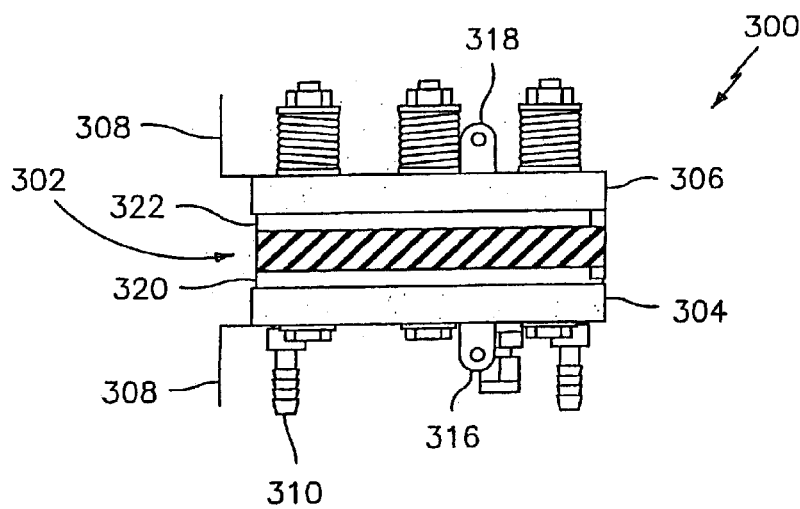
FIG. 3 is a front view of an exemplary embodiment of an electrochemical cell stack.
Figures 4, 5:
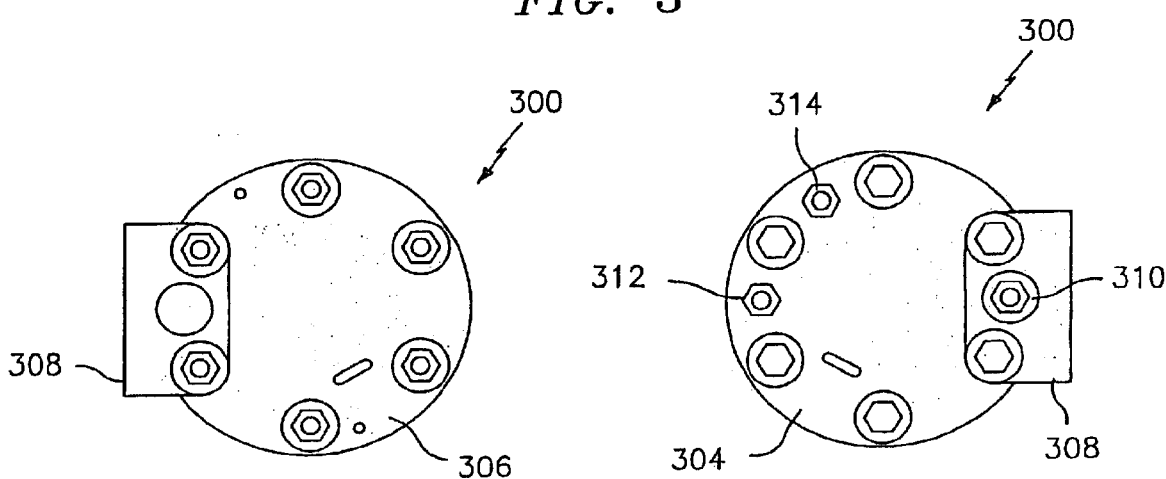
FIG. 4 is one end view of the electrochemical cell stack of FIG. 3.
FIG. 5 is another end view of the electrochemical cell stack of FIG. 3.
Figure 6:
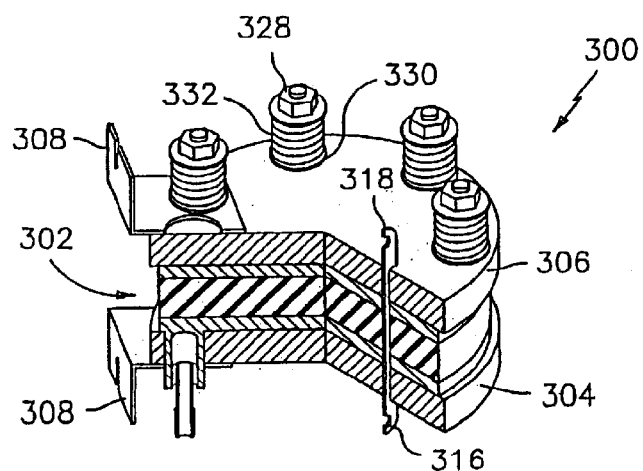
FIG. 6 is a perspective cutaway view of the electrochemical cell stack of FIG. 3.
Figure 18:
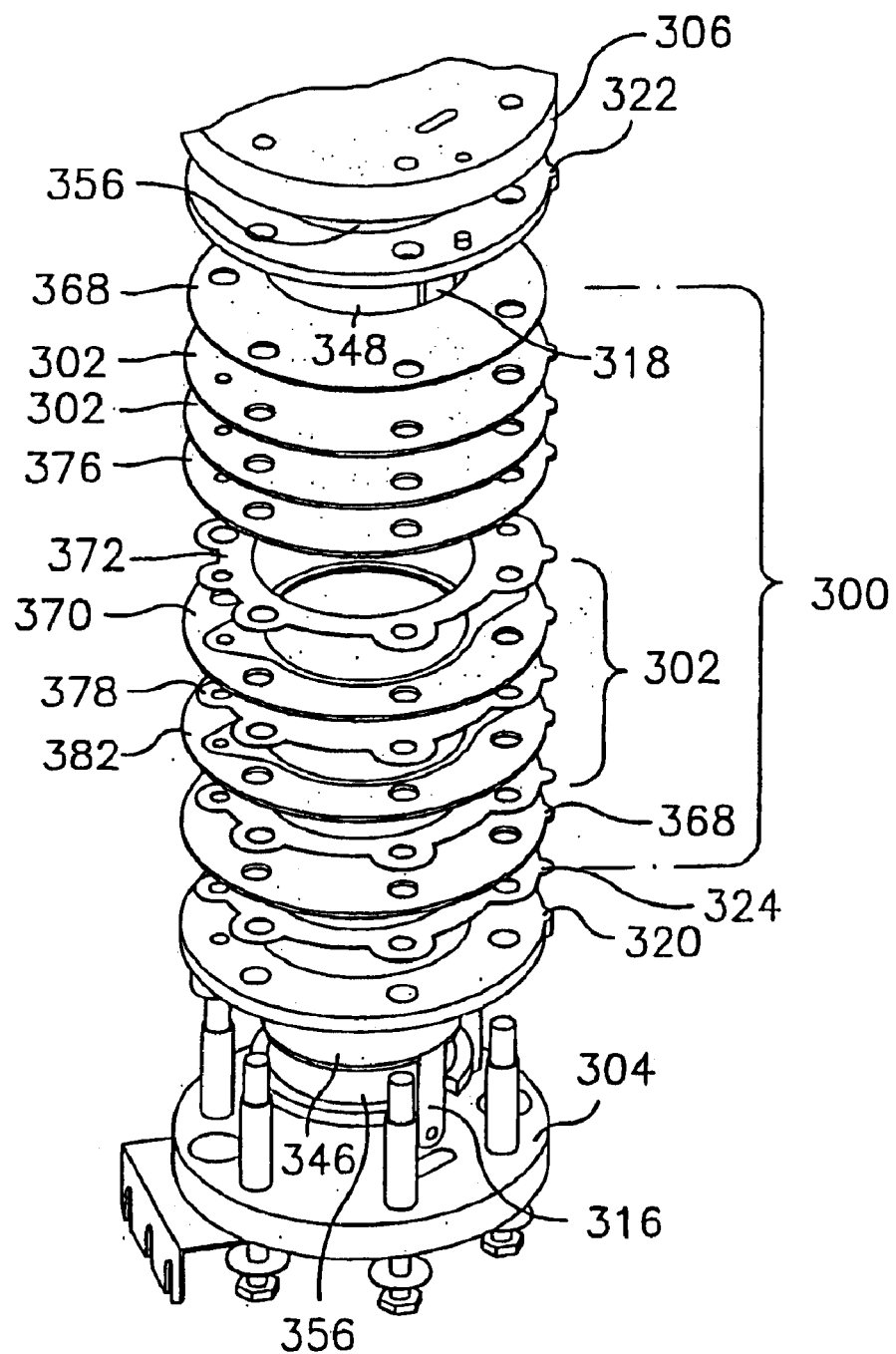
FIG. 18 is an exploded view of an exemplary embodiment of a cell used within the electrochemical cell.

Referring now FIG. 18, a view of cell stack 300 is provided indicating the components therein. The number of electrochemical cells 302 employed vary depending on factors including but not limited to space requirements, hydrogen gas demand, available electrical energy, desired voltage loss, economy, and selected materials of construction. As few as one cell 302 is employed as shown in FIG. 3. As many cells 302 as necessary to effectively conduct electricity through the stack can be connected. For purposes of clarity, only one cell assembly 302 is illustrated in FIG. 12 in exploded form. The additional cells are only representatively illustrated.

Each cell 302 is disposed between separators 368 to prevent fluid communication between cells. Separators 368 are electrically conductive. In one embodiment, separators 368 are titanium sheets between 0.005 and 0.010 inches thick. Other suitable conductive materials for the separators include, but are not limited to, titanium, zirconium, platinum, or palladium.

Each cell 302 includes a membrane electrode assembly 370 having an oxygen electrode (e.g., an anode) and a hydrogen electrode (e.g., a cathode) disposed on opposite sides thereof as described above. Each cell 302 further includes flow fields defined generally by the regions of fluid flow on each side of membrane electrode assembly 370. Thus, on the side of the oxygen electrode, a flow field is created within a frame 372, and on the side of the hydrogen electrode, a flow field is created within a frame 378. Frames 372, 378 are generally formed of plastic material and include suitable passages for fluid flow and openings for structural support. Suitable plastics for frames 372, 378 include, but are not limited to polyetherimides (e.g. ULTEM® 1000 commercially available from General Electric Company, Pittsfield, Mass.), polycarbonates, polysulfonates, or any blend or mixture of any of the aforementioned plastics.

An optional gasket 376 (e.g., formed of materials similar to those described above with respect to gasket 324) is disposed between frame 372 and separator 368 generally for enhancing the seal within the reaction chamber defined on the oxygen side of cell 302 by frame 372, separator 368, and the oxygen electrode of membrane electrode assembly 370.

Frames 372, 378 typically surround (in the radial direction) for example a screen pack that aids in support of MEA 370. The screen pack 380 is disposed in the flow field between the hydrogen electrode of membrane electrode assembly 370 and separator 368, in fluid communication with the hydrogen electrode of membrane electrode assembly 370. An optional gasket 382 is disposed between frame 378 and separator 368 generally for enhancing the seal within the reaction chamber defined on the hydrogen side of cell 302 by frame 378, separator 368, and the hydrogen electrode of membrane electrode assembly 370.

Figure 19:
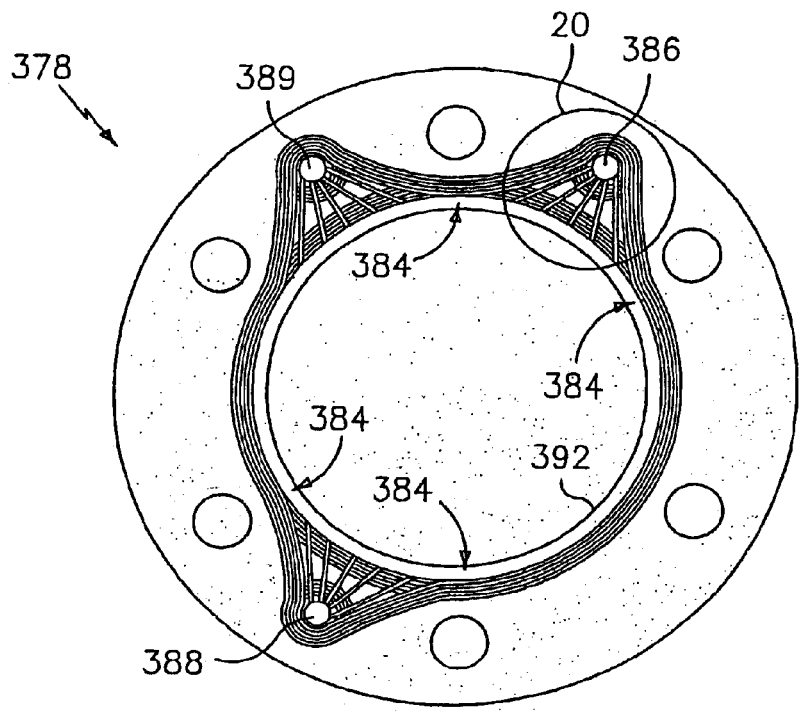
FIG. 19 is a top view of a frame assembly.
Figure 20:
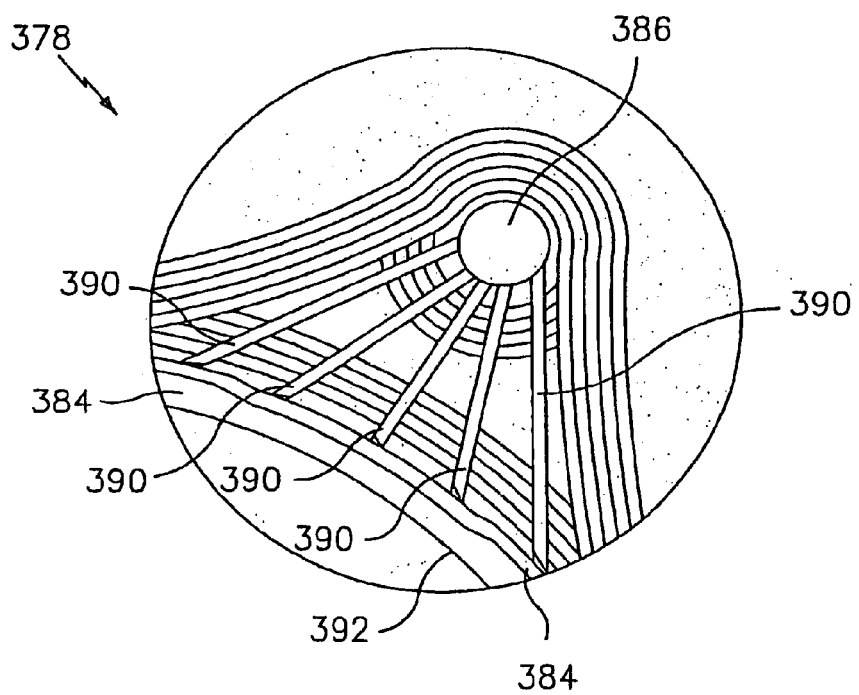
FIG. 20 is an enlarged view of a portion of the frame assembly of FIG. 19.

Referring now to FIGS. 19–20, a portion of frame 378 is illustrated. Frame 378 includes ridges disposed in a surface of frame 378 proximate to the fluid passages. By way of example, ridges are molded, cut, or otherwise formed within frame 372. Frame 372 and/or 378 is provided having one or more gaps 384 between the inside edge and the contents within the flow field. One or more gaps similar to gap 384 are preferably included within the inside edge of the frame in fluid communication with water ports 386 and 388 within the frame. Further, while frame 372 and/or 378 illustrated in FIGS. 19–20 include the ridges, such ridges are not necessary.

Gaps 384 are configured proximate to the water ports (both the ports 386 and 388 traversing axially through a plurality of components and a plurality of manifolds 390 traversing radially from an opening that is part of the axially traversing port to the flow field within the frame 372 and/or 378). Gaps 384 may further be configured to be in fluid communication with ports 386 and 388 via the plurality of manifolds 390.

Gaps 384 enhance even water distribution across the contents allowing a more distributed water flow across the flow field (and the active area of the cell membrane 370). The dimensions of gap 384 vary depending on the desired flow. Preferably, the dimensions are optimized to balance the improved flow with the required support imparted by the frame inside edge.

Figure 1:
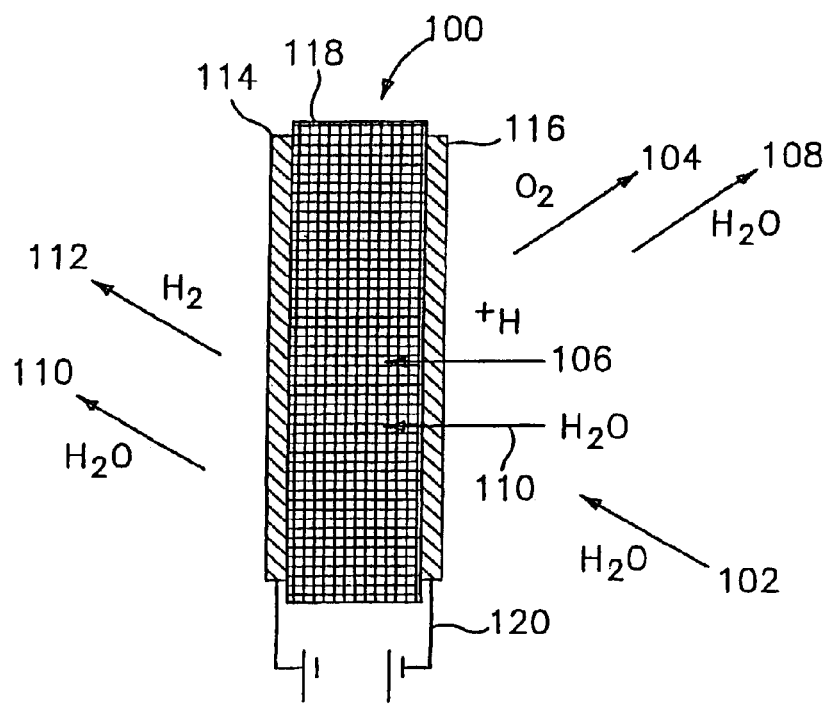
FIG. 1 is a schematic diagram of a partial prior art electrochemical cell showing an electrochemical reaction.

In one embodiment, port 388 is in fluid communication with the water intake and port 386 is in fluid communication with the water and oxygen that exit the cell (e.g., port 388 feeds process water 102 (FIG. 1), and oxygen gas 104 and process water 108 (FIG. 1) are discharged via port 386). A third port 389 is configured to receive output hydrogen gas and to effectively channel the hydrogen gas to fitting 314, as was illustrated with respect to FIG. 1. Use of three ports (in contrast to the four ports commonly seen in the prior art) unexpectedly provides adequate flow of fluids and gases, while at the same time decreases cost of manufacture, and improves resistance to leakage, particularly at high operating pressures.

Referring particularly to FIG. 20, gap 384 is provided along a portion of the height of the inside edge of the frame 372 and/or 378. A protector lip 392 is also provided within the frames 372 and/or 378, generally for preventing the membrane from extruding into the frame contents (e.g., the screen pack). Protector lip 392 is integral with the frame (e.g., molded integrally or machined from the same component as the frame).

In yet another alternative, a gap is created that serves the same or similar function as gap 384 by appropriately formed edges of the contents of the flow field, e.g., within the screen pack.

While the gaps are described herein as being in fluid communication with the water manifolds, it is further contemplated that gaps similar to gaps 384 be employed for enhanced gas distribution, for example in fuel cell operation.

Advantages of the present invention include lower electrical resistance thereby leading to higher current densities, simplicity of assembly and preparation, lower overall cell stack cost, increased reliability, increased cell life, and decreased space requirements.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A frame member for an electrochemical cell stack, comprising:
   an outer periphery;
   an inner periphery;
   a surface defined between said outer periphery and said inner periphery;
   a fluid port defined axially through said surface, said fluid port having a length along said inner and said outer peripheries;
   a plurality of fluid manifolds defined in said surface, each of said plurality of fluid manifolds defining a fluid flow channel between said fluid port and said inner periphery, and at least one of said plurality of fluid manifolds extending along said inner periphery a distance beyond said length of said fluid port; and
   a gap defined in said inner periphery, said gap being radially offset along said inner periphery in a first direction from said fluid port, said gap being in fluid communication with said inner periphery, said at least one of said plurality of fluid manifolds defining a fluid flow channel between said fluid port and said gap.

2. The frame member of claim 1, further comprising:
   a second gap defined is said inner periphery, said second gap being radially offset along said inner periphery in a second direction from said fluid port, said second direction being opposite said first direction, said second gap being in fluid communication with said inner periphery, a different one of said plurality of fluid manifolds defining a fluid flow channel between said fluid port and said second gap.

3. The frame member of claim 1, wherein said plurality of fluid manifolds and said gap enhance fluid distribution across a flow field defined within said inner periphery.

4. A frame member for an electrochemical cell stack, comprising:
   an outer periphery;
   an inner periphery;
   a surface defined between said outer periphery and said inner periphery;
   a fluid port defined axially through said surface, said fluid port having a length along said inner and said outer peripheries;
   a plurality of fluid manifolds defined in said surface, each of said plurality of fluid manifolds defining a fluid flow channel extending radially from said fluid port to said inner periphery, and at least one of said plurality of fluid manifolds extending along said inner periphery a distance beyond said length of said fluid port; and
   a protector lip provided at said inner periphery, said protector lip being adapted to prevent a flow field of the electrochemical cell stack from extruding into said plurality of fluid manifolds.

5. The frame member of claim 4, wherein said protector lip is integral with the flame member.

6. A frame member for an electrochemical cell stack, comprising:

an outer periphery;

an inner periphery;

a surface defined between said outer periphery and said inner periphery;

a fluid port defined axially through said surface, said fluid port having a length along said inner and said outer peripheries;

a plurality of fluid manifolds defined in said surface, each of said plurality of fluid manifolds defining a fluid flow channel between said fluid port and said inner periphery, and at least one of said plurality of fluid manifolds extending along said inner periphery a distance beyond said length of said fluid port; and a gap disposed in said inner periphery, said gap extending about said inner periphery and being radially offset along said inner periphery in a first direction from said fluid port, said at least one of said plurality of fluid manifolds defining a fluid flow channel between said fluid port and said channel.

7. The frame member of claim 6, further comprising ridges disposed on said surface proximate to said fluid port.

8. In a hydrogen generating system including a water source, an electrochemical cell stack, an electrical source, a first separator, a second separator, a dryer, a controller, and a ventilation system, wherein the improvement comprises:

a first flow field within said electrochemical cell stack between a first electrode and a separator, said first flow field being surrounded in the radial direction by a first frame, and a second flow field between a second electrode and a separator surrounded in the radial direction by a second frame, a boundary defined between an inside edge of said first frame and an outside edge of said flow field, wherein said boundary is configured with gaps in fluid communication with one or more manifolds.

9. A frame member for an electrochemical cell stack, comprising:

an outer periphery;

an inner periphery;

a surface defined between said outer periphery and said inner periphery;

a fluid port defined axially through said surface, said fluid port having a length along said inner and said outer peripheries;

ridges disposed on said surface proximate to said fluid port; and a plurality of fluid manifolds defined in said surface, each of said plurality of fluid manifolds defining a fluid flow channel extending radially from said fluid port to said inner periphery, and at least one of said plurality of fluid manifolds extending along said inner periphery a distance beyond said length of said fluid port.

* * * * *